United States Patent
Iwasaki et al.

(10) Patent No.: US 6,807,480 B1
(45) Date of Patent: Oct. 19, 2004

(54) NAVIGATION SYSTEM AND A MEMORY MEDIUM

(75) Inventors: Hironari Iwasaki, Okazaki (JP); Shogo Ito, Okazaki (JP); Kazuhiro Ikeda, Okazaki (JP); Koji Kato, Okazaki (JP); Yasuyuki Takeda, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/632,793

(22) Filed: Aug. 4, 2000

(30) Foreign Application Priority Data

Aug. 6, 1999 (JP) .......................................... 11-224117

(51) Int. Cl.[7] .......................... G01C 21/00; G06G 7/78
(52) U.S. Cl. ....................... 701/209; 701/207; 701/208; 701/212; 701/300
(58) Field of Search ............................... 701/209, 208, 701/207, 300, 212

(56) References Cited

U.S. PATENT DOCUMENTS

| | | | | | |
|---|---|---|---|---|---|
| 5,953,722 A | * | 9/1999 | Lampert et al. | ............ | 707/100 |
| 5,964,821 A | * | 10/1999 | Brunts et al. | ................ | 701/201 |
| 5,968,109 A | * | 10/1999 | Israni et al. | ................ | 701/208 |
| 5,983,158 A | * | 11/1999 | Suzuki et al. | ................ | 701/209 |
| 6,014,090 A | * | 1/2000 | Rosen et al. | ................ | 340/905 |
| 6,038,508 A | * | 3/2000 | Maekawa et al. | ........... | 701/207 |
| 6,144,920 A | * | 11/2000 | Mikame | ..................... | 701/212 |
| 6,240,425 B1 | * | 5/2001 | Naughton | ................ | 707/104.1 |
| 6,408,307 B1 | * | 6/2002 | Semple et al. | ........... | 707/104.1 |
| 6,415,291 B2 | * | 7/2002 | Bouve et al. | ................. | 707/10 |

* cited by examiner

*Primary Examiner*—Thomas C. Black
*Assistant Examiner*—Brian J. Broadhead
(74) *Attorney, Agent, or Firm*—Oliff & Berridge, PLC

(57) ABSTRACT

A vicinity search using register point data in a designated area reduces search time. The vicinity search data include at least category information, names of register points and country information. The search device conducts the vicinity search by specifying any one of category information to which the register points belong, names of the register points and country information, or a combination, by option and display. The search device further uses category information with flags representing the presence and absence of the register point data, whereby the register point data are searched by referring to the flags.

3 Claims, 15 Drawing Sheets

Alphabet Input Screen

| AB | | | | | | | |
|---|---|---|---|---|---|---|---|
| A | B | C | D | E | F | G | H | I |
| J | K | L | M | N | O | P | Q | R |
| S | T | U | V | W | X | Y | Z | 0 |
| 1 | 2 | 3 | 4 | 5 | 6 | 7 | 8 | 9 |
| LIST | BS | CL | Number of remaining lists 1234 | | | | |

LIST ↓     ↑ RETURN

| Number of remaining lists 1234 | |
|---|---|
| A | ABCDEFG |
|   | ABDEFG |
|   | ABGKL |
|   | ABLONN |
|   | ABVZX |

Fig. 7

| The first letter of word | Register point name |
|---|---|
| ⋮<br>B<br>⋮ | ⋮<br>BADAPOZ<br>BADANAH<br>BAIKAL<br>BAQUBAH<br>BARCELONA<br>BARSTOW<br>BASEL<br>BASTAK<br>BASILAN<br>BATH<br>BATHURST<br>BAYERN<br>⋮<br>BEITBRIDGE<br>BELFAST<br>BERLIN<br>BERN<br>BERGEN<br>BERKLEY<br>⋮ |

Fig. 8

NAVIGATION SYSTEM AND A MEMORY MEDIUM

BACKGROUND OF THE INVENTION

1. Field of Invention

This invention relates to a navigation system and memory medium that improve the varieties and efficiencies of searches for a register point within an area such as a vicinity search, an area designated search and so on.

2. Description of Related Art

FIG. 14 is a diagram describing a prior known vicinity search process. When starting the vicinity search process, objects existing within a predetermined limit are searched. The search is executed by searching for register point data (object data) by each area block within the predetermined limit. Further, a hotel may be selected, for example, as a category (genre) to be searched. Hotels are then sorted from the searched register point data and displayed as a list according to their distance from a common origin. Of course, a list can also be displayed by sorting distances only without selecting a category.

FIG. 15 is a diagram describing a search process for displaying a list of categories by designating areas. By selecting areas according to designated categories, for example an administrative unit, then a list of categories common to each area is displayed.

In accordance with a prior known periphery search process, in which a vehicle travels along a specified route guidance, if a stop for meals or shopping is desired, then a user may immediately search for desired facilities by using the navigation system. In such a case, designated categories (genres) that exist within a predetermined limit from a present position (e.g., within 10 km) are displayed in a list. However, if a present position is located near a border between Fukuoka-Prefecture and Yamaguchi-Prefecture, for example, then facilities existing in Fukuoka and facilities existing in Yamaguchi are combined in the list without regard to the types of roads needed to travel to reach the facilities when displayed. Because of this, a user is unable to locate facilities accessible by traveling exclusively on normal roads. Rather, facilities to which the user can go only by traveling on tool roads, i.e., non-normal roads, are also displayed. As a result, a user is likely to select those facilities on non-normal roads by mistake.

Further according to the prior search process, when a category is selected, register point data is displayed in a list only after determining whether each register point data in each area block corresponds to the category selected by the user. This requires a lot of time as all the register point data have to be checked even if the corresponding category does not exist in some area blocks. Moreover, because each area has a fixed list of common categories, a problem arises in that even absent or vacant categories are displayed in a list in some areas.

SUMMARY OF THE INVENTION

The invention conducts a search by designating register point data belonging to the same area when making the vicinity search. The invention further conducts a variety of searches when making the vicinity search. Still further, the invention reduces searching time when making the vicinity search and displays a category list by designating an area in a way corresponding to the area.

As described above, according to the invention, because vicinity search data is provided with area data, such as country names etc. of the register points, a vicinity search can be made by specifying objects in the same area, thereby permitting various searches to be made.

Further, when register points are searched by hierarchically limiting categories, the time required for making the vicinity search can be reduced by obtaining information regarding the presence and absence of the register points belonging to category items in the lower hierarchy categories. Further, when searching categories by designating an area, categories with no register point data in the areas are not displayed as only category items with register point data existing are displayed in a list. Thus, the list can be displayed in a way that accurately corresponds to the area.

The navigation system and memory medium of the invention comprises an input means for inputting information to conduct a vicinity search including at least information regarding a reference position of the vicinity search, a display means for displaying a search result, an information storage means for storing at least the vicinity search data and a search means for making the vicinity search on the basis of data input by the input means and stored in the information storage means, wherein the vicinity search data includes at least area information and the search means conducts the vicinity search on the basis of the area information to which register points belong and outputs the search result to the display means. The invention includes area information wherein the area information is country information, district information, prefectural information or municipality information. The navigation system of the invention further comprises an input means for inputting information necessary to conduct the register point search within the area, a display means for displaying the search result, an information storage means for storing data necessary for at least the register point search, a search means for making the register point search within the area on the basis of information input by the input means and data stored on the information storage means, wherein the register point search data within the area include category information to which flags are associated for representing whether register point data are present or absent, and the search means searches for register point data by referring to the flags. The navigation system of the invention further conducts the register point search within the area of the vicinity search and the search means searches for register point data on the basis of information regarding the reference position input by the input means, wherein the register point data is controlled by dividing each vicinity into an area or block, and category information is stored on the basis of each area or block such that a flag representing whether register point data are present or absent as category information of each area or block. Thus, the register point data are controlled on the basis of each category and a flag representing whether the data are present or absent, is given as category information of each area or block, wherein a data structure of category information is hierarchical and flags are given representing whether register point data exist in categories of the lower hierarchy before proceeding to a category of the upper hierarchy. The register point search within an area is the area designated search and the search means searches for register point data on the basis of information regarding an area input by the input means. The area may be a country or an administrative unit, or the like.

The invention further provides a memory medium that stores a program for conducting a vicinity search and for displaying a search result, wherein the conducting of the vicinity search includes searches for area information on the basis of the input reference position for the vicinity search.

The memory medium further stores a program for searching for register points within an area on the basis of input data and stored data and for displaying a search result, wherein the step for searching the register points within the area makes a search by referring to flags given to categories in an area that represent whether register point data are present or absent in the area. Further the memory medium of the invention searches for register point data within a predetermined area on the basis of each category and stores a flag representing the existence or absence of register point data based upon either the searched register point data or the category information data for displaying categories.

BRIEF DESCRIPTION OF THE DRAWINGS

FIG. 7 is diagrams showing alphabetical input screens;

FIG. 8 is a diagram showing an example of register point data structure when inputting alphabetically object names;

DETAILED DESCRIPTION OF PREFERRED EMBODIMENTS

Figure 1:
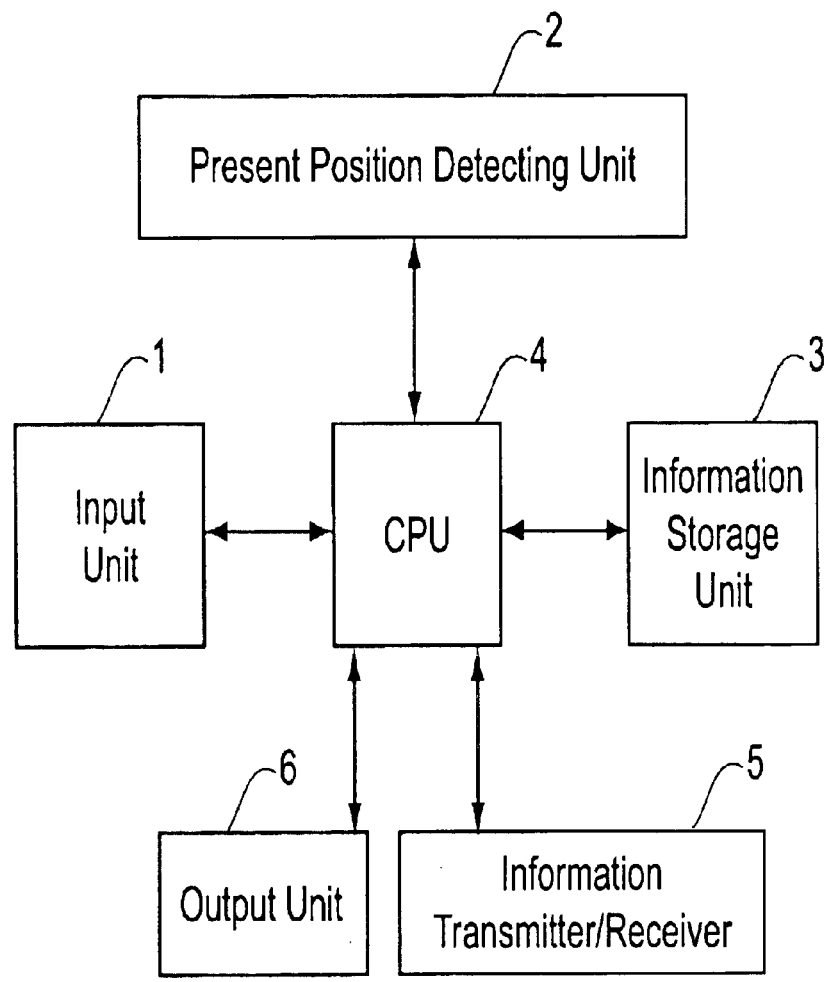
FIG. 1 is a diagram showing an example of the composition of a vehicle navigation system according to the invention.

Embodiments of the invention will be described below with reference to the drawings. FIG. 1 is a diagram showing an example of a navigation system according to the invention. The invention is composed of an input unit 1 for inputting information regarding route guidance; a present position detecting unit 2 for detecting information regarding a present position of a vehicle; an information storage unit 3 for storing therein navigation data required for calculation of routes, display/audio guidance data required for route guidance, programs (application and/or OS) and the like; a central processing unit 4 for providing control over the entire system; an information transmitter/receiver 5 for transmitting and receiving information regarding the present position, and an output unit 6 for outputting information regarding route guidance.

The input unit 1 is provided with functions for inputting a destination and instructing the central processing unit 4 to execute navigation processing in conformity with a driver's intention. As the means for attaining such functions, a remote controller, such as a touch switch, a jog dial or the like, is used for inputting a destination in the form of telephone coordinates on a map and for requesting route guidance. Further, the invention is provided with a unit for performing the interaction by voice input, which functions as a voice input unit. There may also be added a record card reader for reading data recorded in an IC card or a magnetic card. Furthermore, there may be added a data communication device to provide data communications between information sources, such as an information center for accumulating therein data necessary for navigation, via communication links upon the driver's request. A portable style electronic device having map data, destination data, and data of a simple frame map and a building shaped map and the like may be added as well.

The present position detecting unit 2 receives information on the present position of the vehicle by using the Global Positioning System (GPS), an absolute direction sensor, such as a geomagnetic device for detecting the travel direction of the vehicle, a relative direction sensor, such as a combination of a steering sensor and a gyro sensor, for detecting the relative travel direction of the vehicle, and a distance sensor for detecting the travel distance according to a number of revolutions of a wheel, for example.

Figure 11:
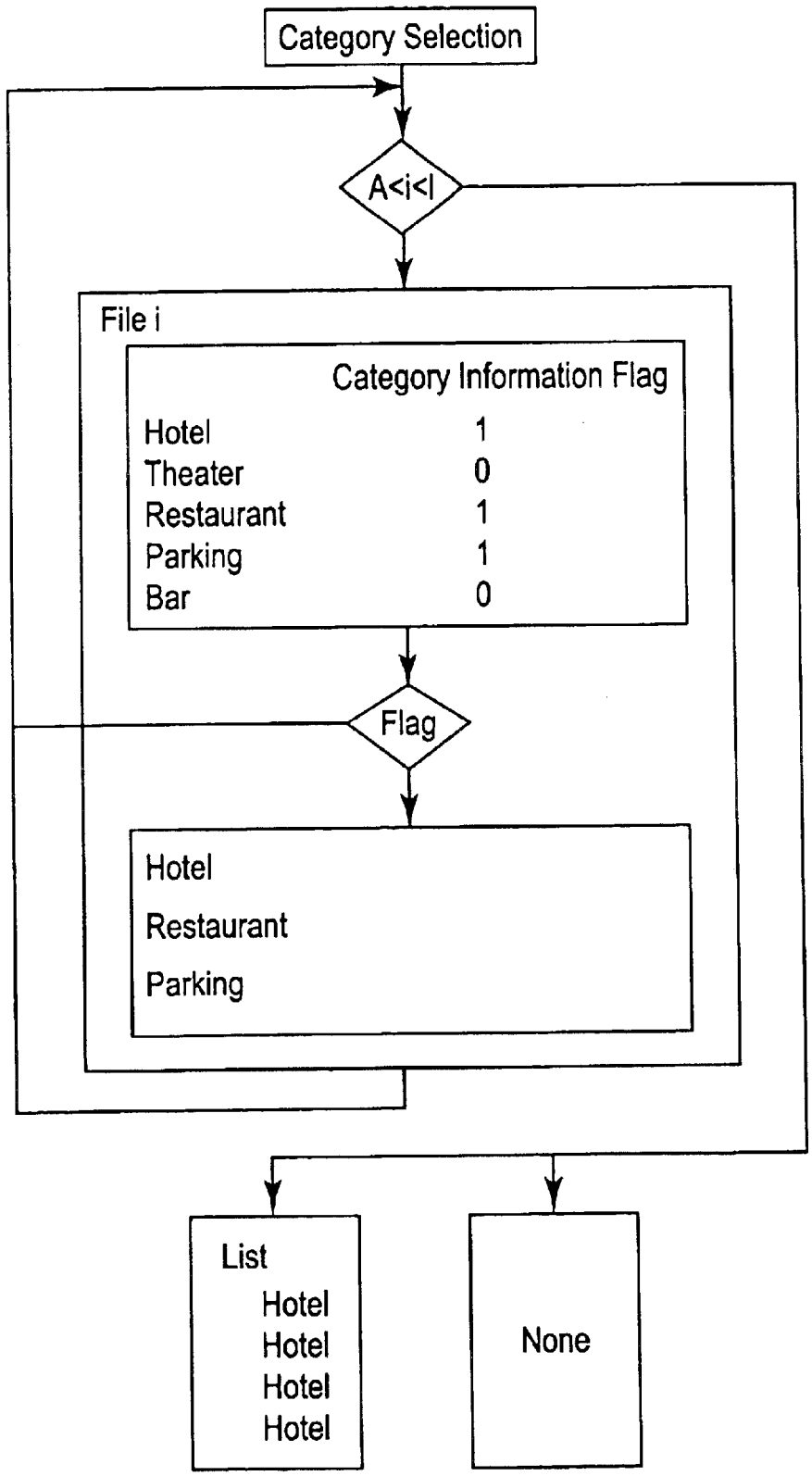
FIG. 11 is a flowchart describing a searching method in category selection.

The information memory device 3 is an external storage device in which programs and data for navigation are stored. The information memory device 3 may be, for example, a CD-ROM, a DVD-ROM, or the like. The programs stored therein include a program for processing the route search. Such a processing program is shown in FIG. 11 as a flowchart and includes a program for performing guidance in the interactive manner by the voice input and necessary data therefor, and a program for performing the voice output control necessary for the voice guidance and necessary data therefor. The data to be stored therein are composed of files, such as map data, search data, guidance data, map matching data, destination data, register point data, road data, genre data, landmark data and the like, wherein all the data necessary for navigation are stored. In addition, the invention can be applied to a system in which the CD-ROM contains only the stored data and the central processing unit contains the programs.

The central processing unit 4 comprises a CPU for performing various calculation processing; a flash memory for reading and storing the programs from the CD-ROM of the information memory unit 3; a ROM containing a program (or program reading means) for checking and updating the programs contained in the flash memory; a RAM for temporarily storing the searched route guidance information, such as the point coordinates of a set destination, a road name code No., or the like or data under the calculation processing. The central processing unit 4 further provides a voice processor for processing the voice input from the input unit 1 and for synthesizing and transforming a voice, a phrase, a sentence, a sound, or the like, into an analog signal and outputting it to the speaker. The CPU 4 further provides a communication interface for transferring the input/output data, a sensor input interface for receiving the sensor signal of the present position detecting unit 2, and a clock for writing the date and time as an internal diagnosis information. In addition, the program for an updating process may be stored in an external memory unit.

The programs according to the invention and the other programs for executing navigation may be wholly stored in a CD-ROM as an external memory medium, or they may be partially or wholly stored in the ROM. The data and programs stored in the external memory medium are input as external signals to the central processing unit 4 of the navigation system and processed by calculation so that various navigation functions are realized.

As described above, the navigation system includes a flash memory having a relatively large capacity for reading programs from the CD-ROM of the external memory unit, and a ROM having a small capacity that contains a program (or program reading means) for starting the CD-ROM. The flash memory is the non-volatile memory means for maintaining the stored information even if the power is turned off. As an initial processing of the CD-ROM, the programs stored in the ROM are initiated to check the programs stored in the flash memory and to read the disc managing information etc., stored in the CD-ROM of the information storage unit 3. The loading (or updating) operation of the programs is executed by determining that information and the state of the flash memory.

The information transmitter-receiver 5 comprises a GPS receiver for obtaining information by making use of the satellite navigation system (GPS), and a VICS receiver for obtaining information via FM multi-channels, electric beacons, light beacons, etc. A data transmitter is exemplified by a portable telephone, a personal computer, or the like for exchanging the information with an information center (e.g., ATIS), other vehicles, and the like.

The output unit 6 is provided with functions for outputting voice/display guidance information required by the driver, and for outputting the navigation data processed in the CPU 4 to the printer. As means for realizing these functions, the output unit comprises a display for displaying input data on a screen or for displaying a route guidance screen, a printer for outputting the data processed in the CPU 4 or the data stored in the information memory unit 3 to the printer, a speaker for outputting route guidance by voice, and the like.

The display includes a color CRT or liquid-crystal display device, for example, and display screens show enlarged intersections, destination names, times, distances, travel directions, character images, and the like on the basis of map data or guidance data processed by the central processing unit 4. The image data transmitted to the display are binary image data (bitmap data) so that not only a communication line used for a serial communication is used but also other communication lines can be used for the transmission. As a result the data are not transmitted through a special-purpose signal. The display is provided with a memory for temporarily storing the bitmap data. In addition, the display is mounted in the instrument panel of the vehicle, in the vicinity of the driver's seat, so that the driver is able to confirm the present position of the vehicle and conveniently obtain information on a next route to follow. The display may be composed so that points or roads, etc., can be input by touching or tracing the screen with a tablet, a touch panel, a touch screen etc., a detailed description of which is omitted.

A flow of the entire navigation system according to the invention is hereafter described. The route guidance program is initiated upon reading the program of the information processing unit 3 to the central processing unit 4, after which, a vehicle's present position is detected by the present position detecting unit 2. Then a vicinity map with the vehicle's present position being its center is displayed with a name of the present position. Thereafter, a destination is determined using an object name, such as a place name, a facility name, a telephone number, an address, a register point, a road name or the like, and a route search from the vehicle's present position to the destination is executed. When a route is determined, route guidance/display is repeated until the vehicle arrives at the destination, with the vehicle's changing present position having been traced throughout the route by the present position-detecting unit 2. If a new input is executed when the vehicle stops on the way before arriving at the destination, a search area is established on the basis of the new input and a new search is conducted for the new area. At the same time, the route guidance is repeatedly executed until the vehicle arrives at the destination.

Figure 2:
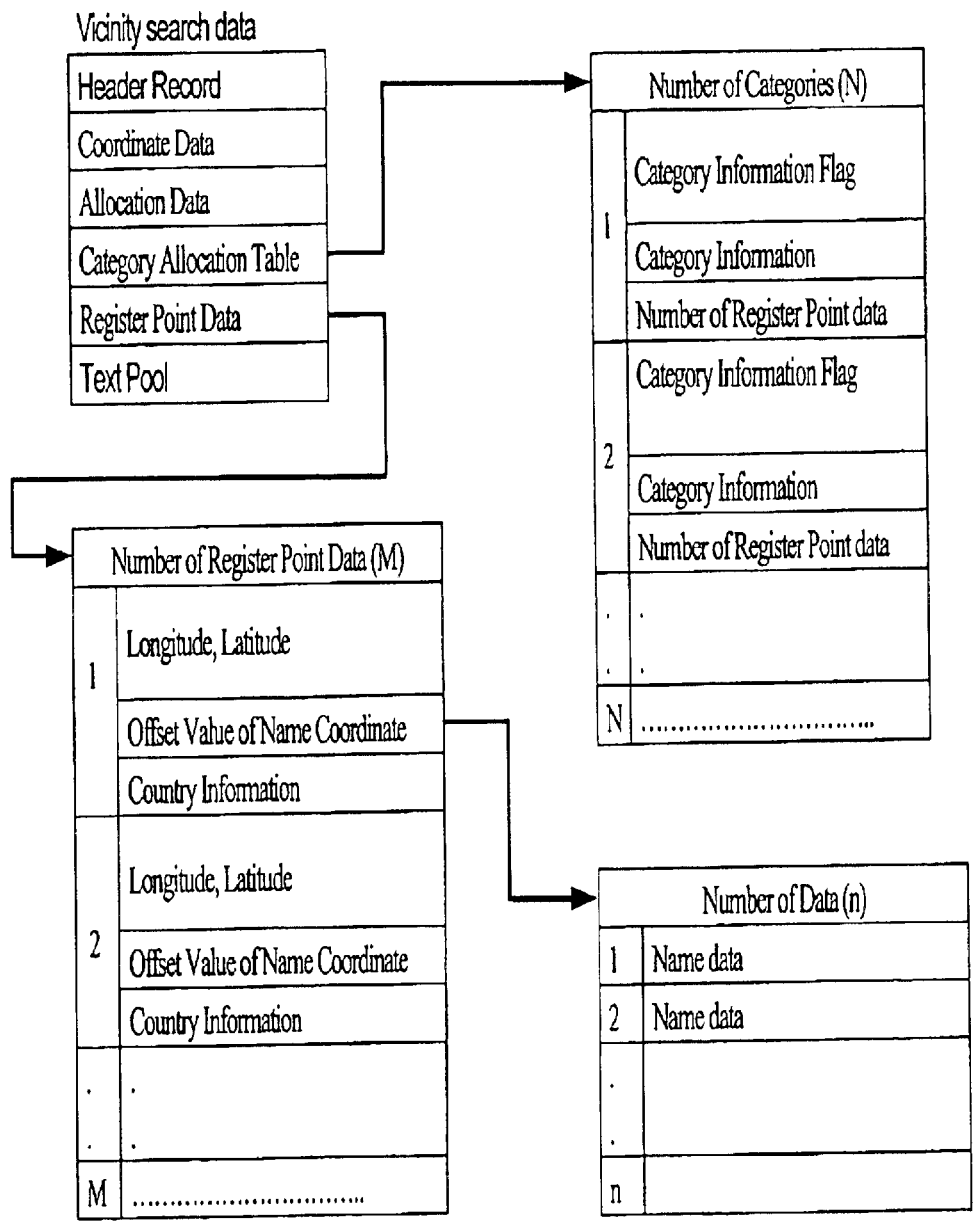
FIG. 2 is a diagram showing an example of vicinity search data structure according to the invention.

FIG. 2 is an example of a vicinity search data structure. In the vicinity search, wherein the user inputs categories (genres), a limited number of coordinates and other search references are deemed register points existing within a limit designated according to a reference position selected by the user or otherwise determined automatically by the position detecting unit 2, whereby the detected vehicle's present position is its center. The register points are searched, according to the designated search reference and are selected and weighted in response to the designated research reference. Priorities are given thereto and they are displayed in the order of the priorities.

The vicinity search data consist of data (files) on the basis of each area block, wherein file numbers showing the amount of data are stored in the header record. Information regarding each block is stored as coordinate data. Information regarding the location of each data is deemed allocation data. The genre allocation table contains flags representing the presence or absence of category information, the classifications of categories, and the number of register point data. The register point data contain information of the longitude and latitude coordinates thereof, offset names indicative of locations of name data of the register points, and information about a country to which these points belong. The text pool stores therein name data (character strings) of the register points.

Figure 3:
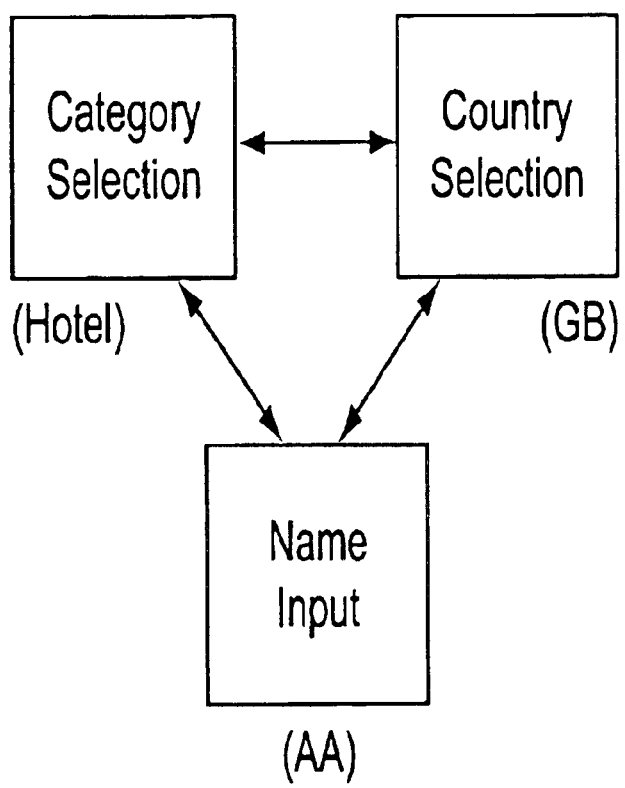
FIG. 3 is a block diagram describing an example of vicinity search according to the invention.

FIG. 3 is a block diagram describing an example of a vicinity search according to the invention. As shown in FIG. 2, vicinity data stores category information, coordinate information of each register point, country information and register point names. Therefore, the vicinity search is made within a predetermined limit by designating any one of categories, countries, names or a combination thereof. Thus register points are displayed in a list based upon their location relative to the reference location.

Figure 4:
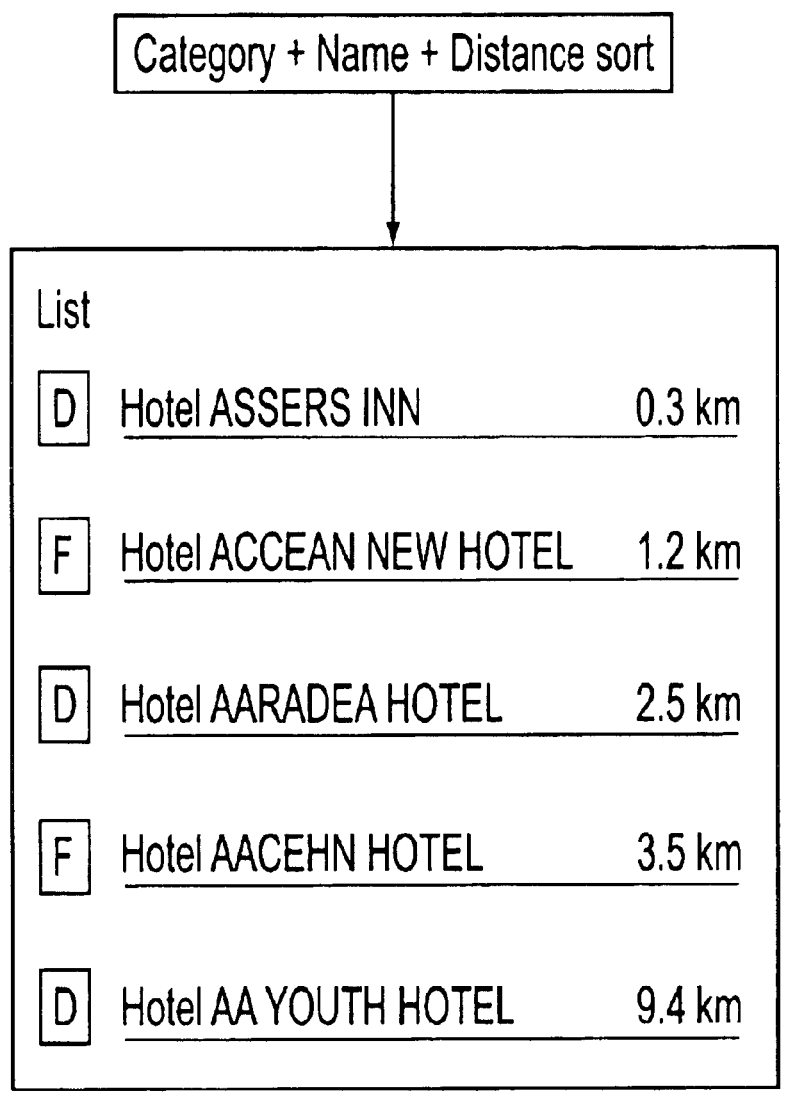
FIG. 4 is a diagram showing an example of a list in which a plurality of register points is searched by category+name and sorted according to distance.

FIG. 4 shows an example of a search made by a category and a name and listed according to distances from a common origin. In this example, register points are searched by a combination of the category "HOTEL" and the name "AA". The register points are then sorted in accordance with distances thereof from a common origin. The country name (D) or (F) is given to each hotel, thus showing, in this example, that the vicinity search was made near a border between Germany and France.

Figure 5:
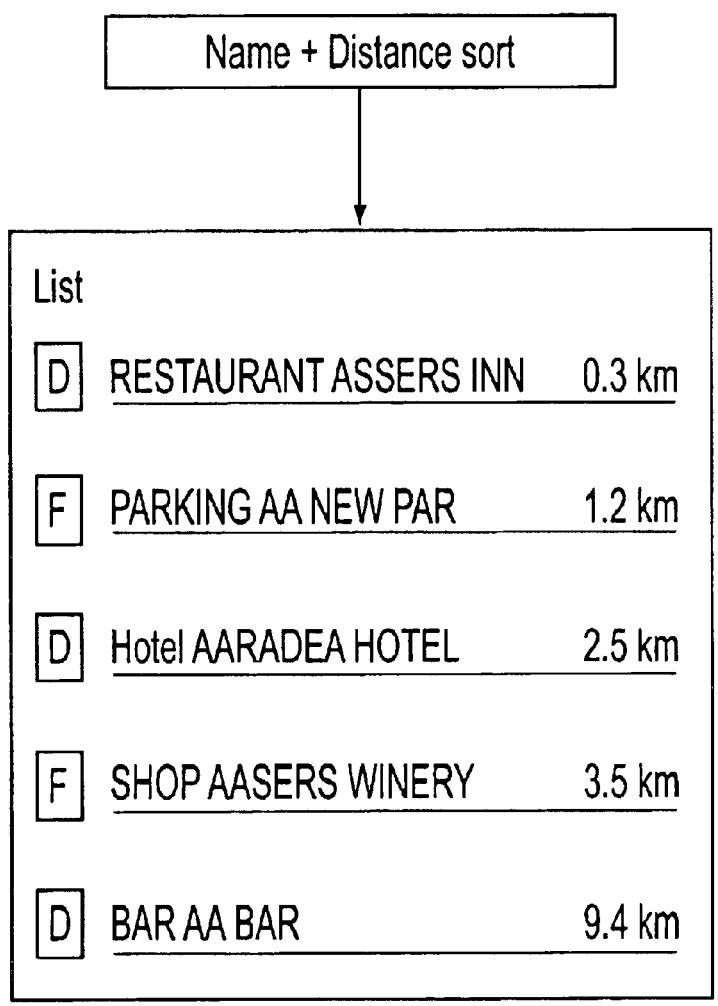
FIG. 5 is a diagram showing an example of a list in which a plurality of register points is searched by name and sorted according to distance.

FIG. 5 shows an example of a search made by name only and sorted in accordance with the distances from a common origin. The register point data having names inclusive of the character string (AA) are displayed in order of the nearest register point to the common origin reference position. The country name (D) or (F) is given to each register point data as well, which indicates that the vicinity search is again made near the border between Germany and France.

Figure 6:
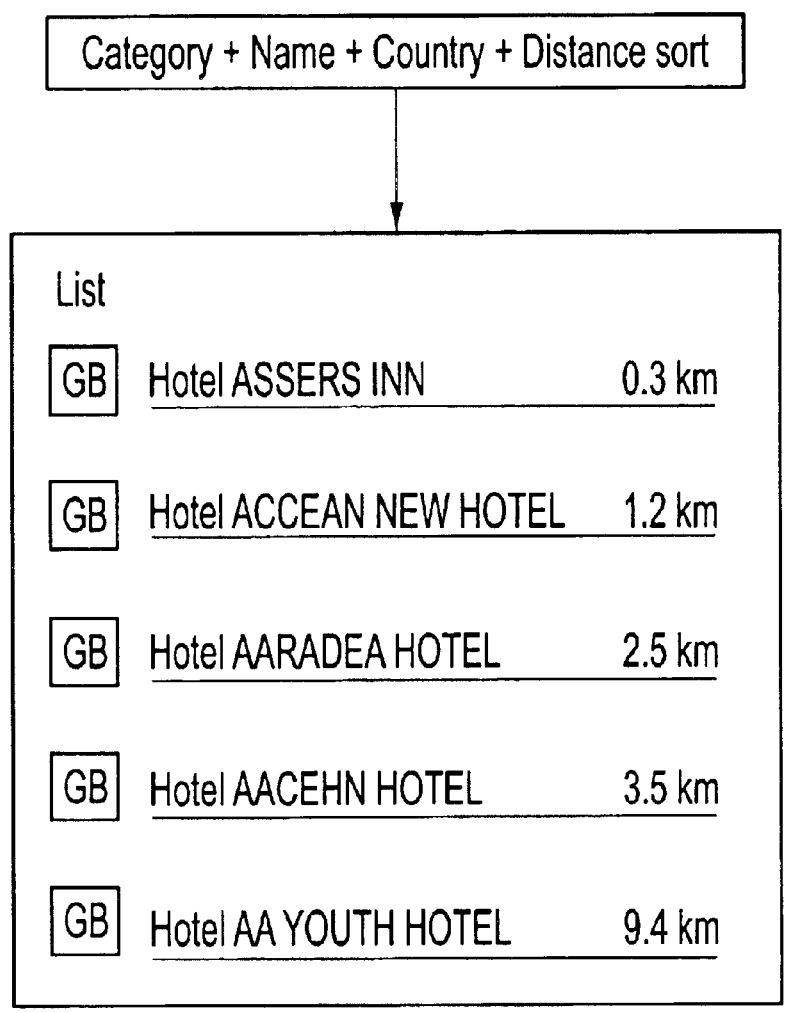
FIG. 6 is a diagram showing an example of a list in which a plurality of register points is searched by category+name+country and sorted according to distance.

FIG. 6 shows an example of a search made by the combination of a category, a name and a country, wherein the search results are sorted in accordance with distances from a common origin. The register point data are searched by the category "HOTEL", the name "AA" and the country "GB". Upon completion of the search the country information is given and hotels are displayed in a list in order of location relative to the common origin reference position.

Other than the above examples, a search may also be made by any of several combinations, such as by name and a country, a category and a country, just a category, just a name or the like, to produce a list sorted in accordance with distances from the common origin reference position. As described above, if a name can be input, a data search can be made so that only corresponding items are displayed on a list. Further, the vicinity search can be made by designating countries. For example, if a search is made near a border in Europe, register points can be sorted in accordance with respective countries and information of respective countries can be therefore searched. As a result, the search can be made in a variety of way to meet a driver's demand.

Next, an example of name input processing in the vicinity search is described.

FIG. 7 shows an alphabetical input screen, wherein a first letter of the name "A" is input and a second letter of the name "B" is input. Thereafter a display indicates that a following letter or number is limited to the highlighted "B, E, H, J, M, O, R, U, Y, 3, 4, 5, 6, 7" characters. At the same time, a remainder list number is displayed as 1234. At this point in the processing, when a "LIST" key on the screen is pressed, all the register points having the first 2 letters beginning as "A B", are displayed on a list. In the figure, the list highlights "ABCDEFG" as a target register point that can be selected and input with a key operation, a remote control operation or the like. If the remainder list number is large, making it difficult to find a target name in the list on the display screen, increasing the input characters results in less corresponding items in the list. Thus, it is the goal to select a destination name displayed in the list when the remainder number becomes small. In addition, if the character input is carried out until the remainder number shows 1, the remaining name is automatically selected and input with the key operation. The character input is not only executable from the touch panel but also it may be input by voice, if a voice input unit is provided. Further, a name input can be made in the same way as above by using the Japanese phonetic symbols rather than westernized alphabetic inputs.

FIG. 8 shows an example of a register data structure when a destination is input by alphabetical input, wherein all the register names having the beginning letter "B" and the second letter "A" are BADAPOZ, BANDANAH, BAIKAL, BAQUBAH, BARCELONA, BARSTOW, BASEL, BASTAK, BASILAN, BATH, BATHUEST and BAYERN and all the register names having the beginning of the letter "B" and the second letter "E" are BEITRIDGE, BELFAST, BERLIN, BERN, BERGEN and BERKLEY.

Using the data structure of FIG. 8, if a user wishes to input "BARCELONA" as a target name, the remainder number of the twelve items discovered is displayed due to input of "BA". The remainder number would be two if further inputting of "BAR" were executed, which would reduce the item found to BARCELONA and BARSTOW. Pressing "LIST" at this stage would show, "BARCELONA" and "BARSTOW" in the list. Inputting "BARC" instead would result in a remainder number of one as only BARCELONA would remain. Therefore, "BARCELONA" is selected in this latter case and it is not necessary to input all 9 letters composing "BARCELONA".

In the same manner, if "BERLIN" is set as a target name, the remainder number of six remains unchanged by inputting "BE" or even further inputting "BER" only reduces this list to four names. Only when inputting "BERL" does the remainder number become one resulting in BERLIN being finally selected. Where only BE or BER is inputted, "BERLIN" may be selected from a list displayed when the user input the list key function to display the remainder number of six items. This, therefore, completes the entire term of "BERLIN" by inputting only 2 or 3 letters.

Next, a reduction of searching time in the vicinity search is described.

Figure 9:
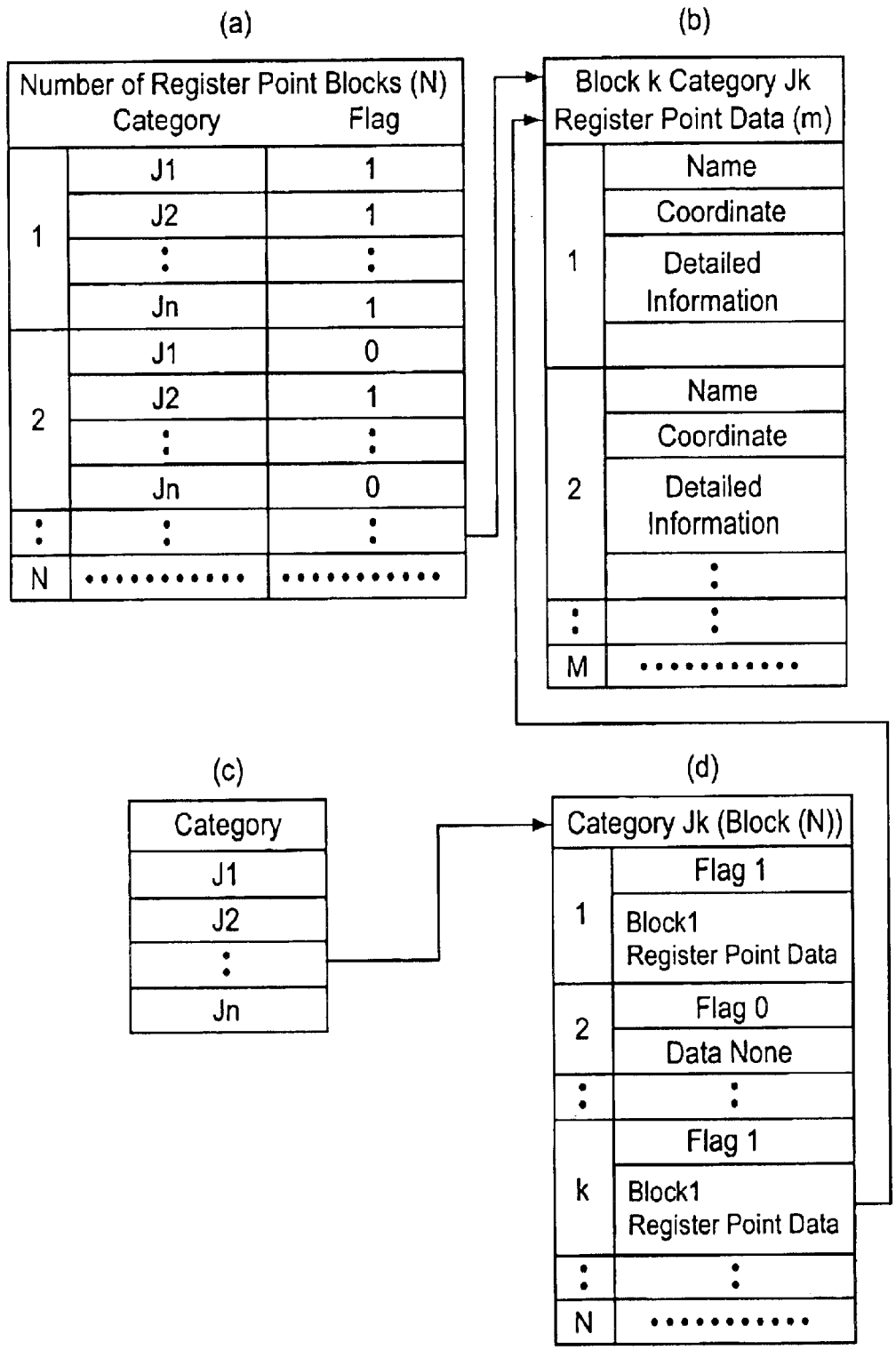
FIGS. 9(a), (b), (c) and (d) are diagrams showing respective genre data structure according to respective area blocks used when making a vicinity search within a predetermined limit.

FIG. 9 shows a category data structure wherein each area block is used for making a search within the predetermined limit in the vicinity search. FIG. 9(a) is a register point block data structure in which each block shows a predetermined area and an administrative unit composed of several blocks. Each block of 1–N is established with categories J1–Jn, with flags representing whether register point data belonging to respective categories exists. For example, in block 2, because category J1 shows a flag representing "0", it means no object exists in that category, and since category J2 shows a flag representing "1," it means at lease one object exists in this category. Thus, the user can discover the presence or absence of objects in each category from the flags. FIG. 9(b) shows a register point data structure corresponding to categories in a register point block, wherein names, coordinates, detailed information, etc. are established. FIG. 9(c) shows categories and FIG. 9(d) shows a register point data structure corresponding to blocks in a category, wherein each block includes a flag showing the presence or absence of register point data For example, since block 1 shows a flag representing "1", it means there is register point data in block 1. On the other hand, block 2 shows a flag indicating "0", indicating there is no register point data therein. Each register point data is further described in a data structure of FIG. 9(b).

Regarding the vicinity search, a switch over to vicinity search mode is accomplished by selecting the vicinity search on a menu screen of the navigation system. A search limit is set, then register data within the limit are searched and a number of items and list names corresponding thereto are displayed. At this stage, as shown in FIG. 9, as the presence or absence of register point data in each category can be judged by giving a flag in a block of one category, register points can be searched effectively. In this case, not only categories given flags representing "presence" are displayed, but also categories given flags representing "absence" may be displayed at the same time provided a distinction between them is apparent. For example, the flags may be displayed in different colors, or categories given flags representing "absence" may be displayed by darkening the tone of a color as a method of distinction.

Further, if flags are given to categories, category data may be a hierarchical structure, wherein flags representing the existence of register point data exist in the lower hierarchy may be given to categories in the upper hierarchy. In this way, when a flag of categories in the upper hierarchy is "0", it is not necessary to search for categories in the lower hierarchy resulting in reduced searching time.

In addition, a predetermined limit in the vicinity search may be set such that the vicinity search occurs only within a predetermined distance from a reference position within a geographical area. The reference position may be a vehicle's present position or the cursor position. Further, the geographical area may be within an administrative area including the vehicle's present position or the cursor position, or it may be within an area prescribed by telephone numbers or postal codes including the present position or the cursor position. Further, an area adjoining the administrative area including the present position or the cursor position may be intended for a searching area. In addition, register points within the geographical area or the predetermined distance are searched according to the above block units.

An area for register point search within the area is within a predetermined limit for the vicinity search and/or a designated area for the area-designated search.

Figure 10:
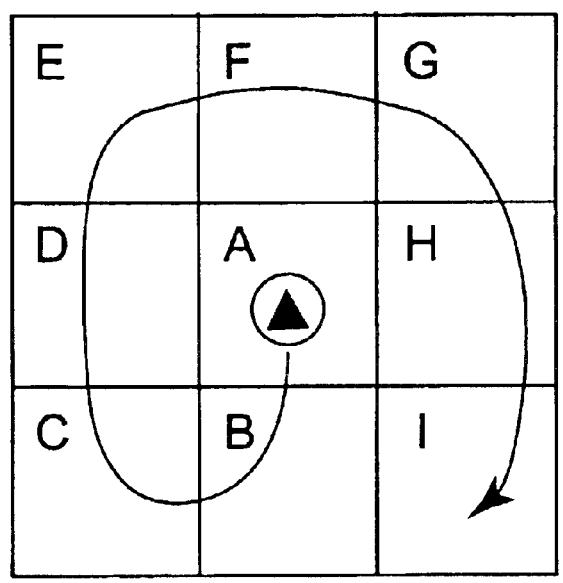
FIG. 10 is a diagram describing access to data when making a vicinity search.

FIG. 10 is a diagram describing access to data at the time of vicinity search. A–I are files representing data of area blocks. A mark within a file A shows a present position of the vehicle. Access to the data at the time of vicinity search is executed in the order of the nearest file from the driver (present position), namely A_B_C_ . . . H_I as shown with a curved arrow.

FIG. 11 is a flowchart describing a search method for a category selection, whereby the search method checks data of each file from a file A in the order of A_B_C_ . . . H_I as shown in FIG. 10. If a file is one of the files A through I, then it is checked whether the flags given to categories in each block are "1" or "0". Then the categories of flag "1", namely hotels, restaurants and parking are listed. On the other hand, if all the files are checked, then items of each category are displayed in lists or, "absence" is displayed when the flag represents "0". According to the previous method, all the data are searched on the basis of one item after the user selects a category and if the item belongs to the category selected by a user, it is then displayed in the list. Therefore, all the data must be searched for some area blocks even if the selected category does not exist therein. On the other hand, according to the invention's method, first flags given to each category in a file are checked then items of the category are not checked if the flag is "0" so that searching time can be reduced.

Next is described an area-designated search.

The area-designated search is for searching register points of desired categories within an area. The designated area may be intended for an administrative unit such as a country, a region, a state, a prefecture, a city, a town, a village etc., or for an area prescribed by telephone numbers or postal codes. Further, areas adjoining the designated area may be intended for search areas. Search data has the same data structure as data shown in FIG. 9(*a*) with given flags representing whether register point data exist in each category on the basis of each area block.

Figure 12:
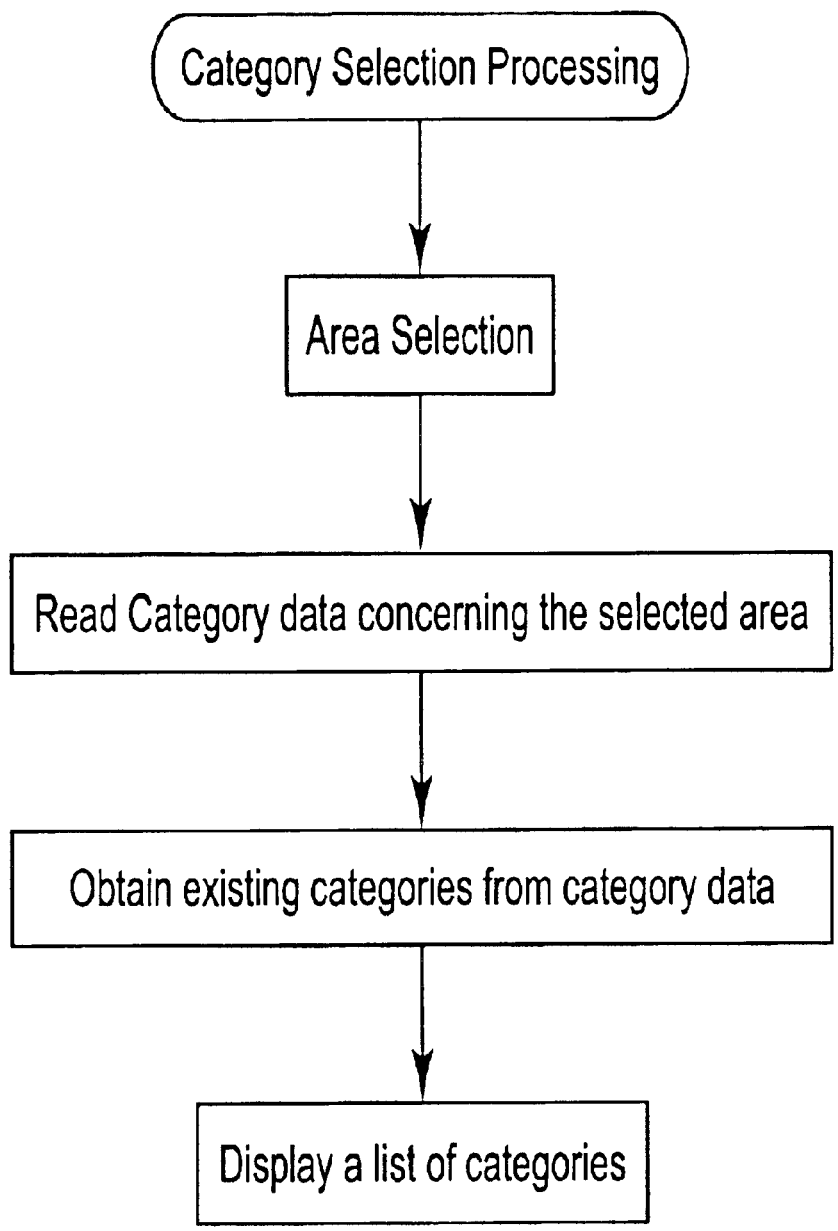
FIG. 12 is a flowchart describing a category selection process.

FIG. 12 is a flowchart describing a category selection process, whereby an area is selected and category data belonging to the area are read. Because flags representing absence or presence are given to category data, categories with no register points are excluded by referring to flags. Therefore, only categories with register points are obtained and displayed in a list.

Figure 13:
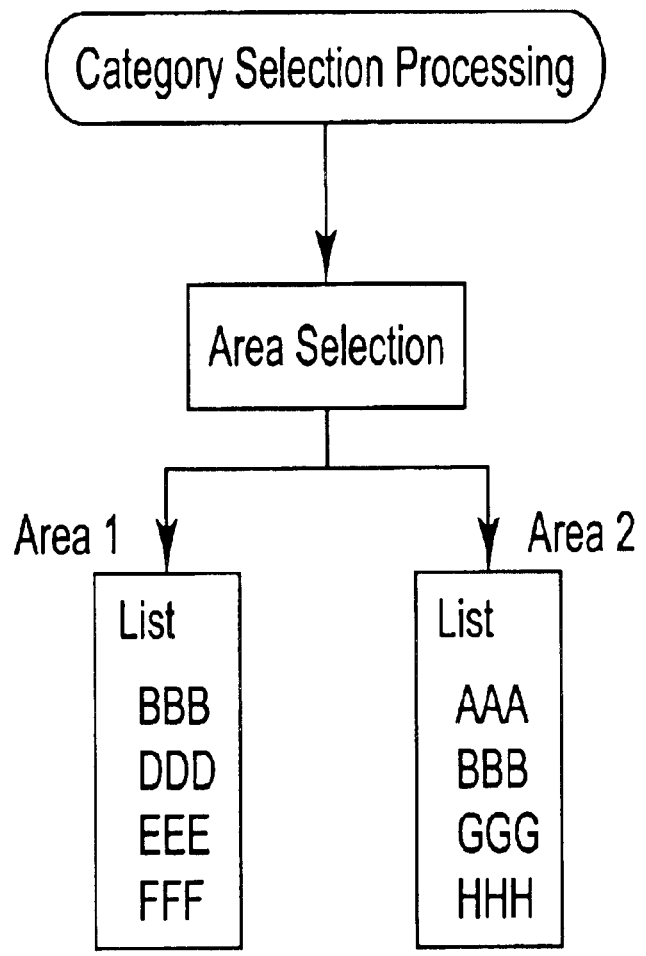
FIG. 13 is a flowchart describing a display screen of selected categories.
Figure 14:
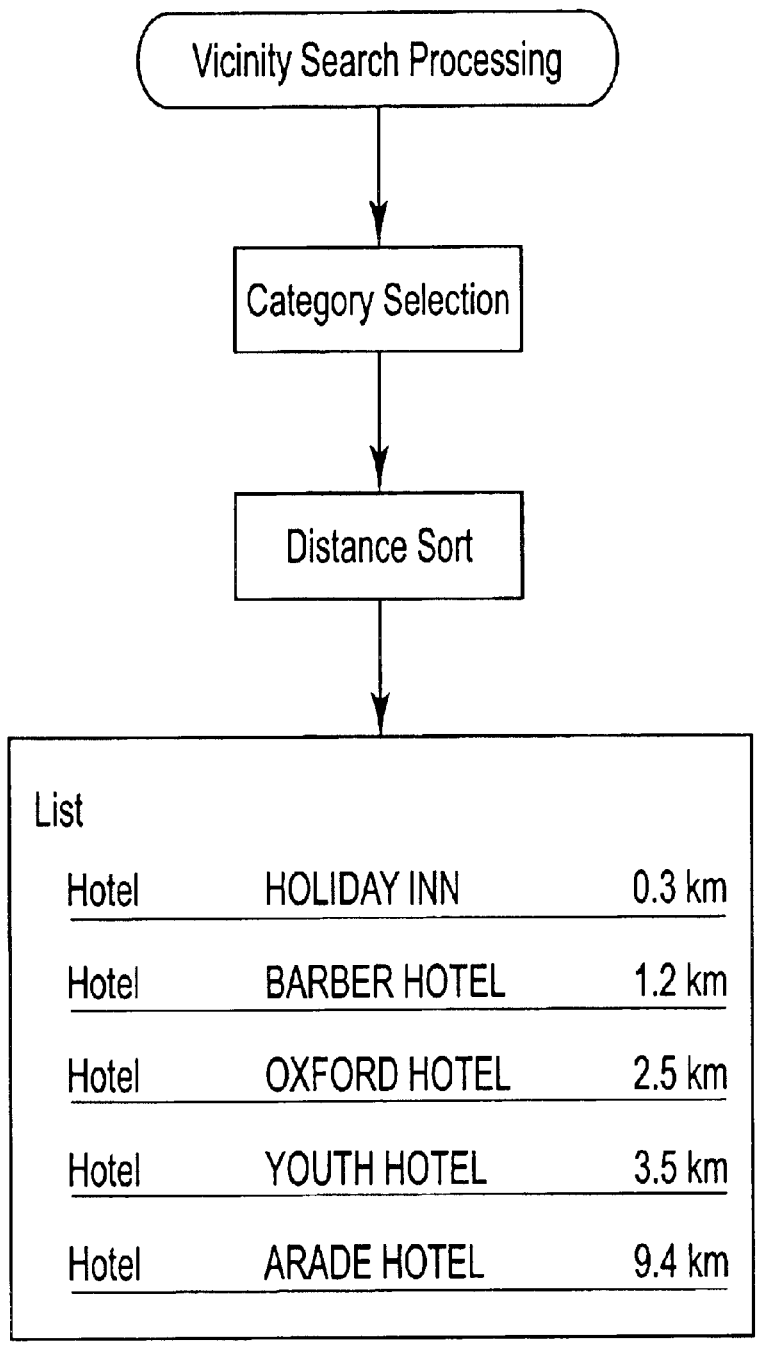
FIG. 14 is a flowchart describing a vicinity search process according to a related approach.
Figure 15:
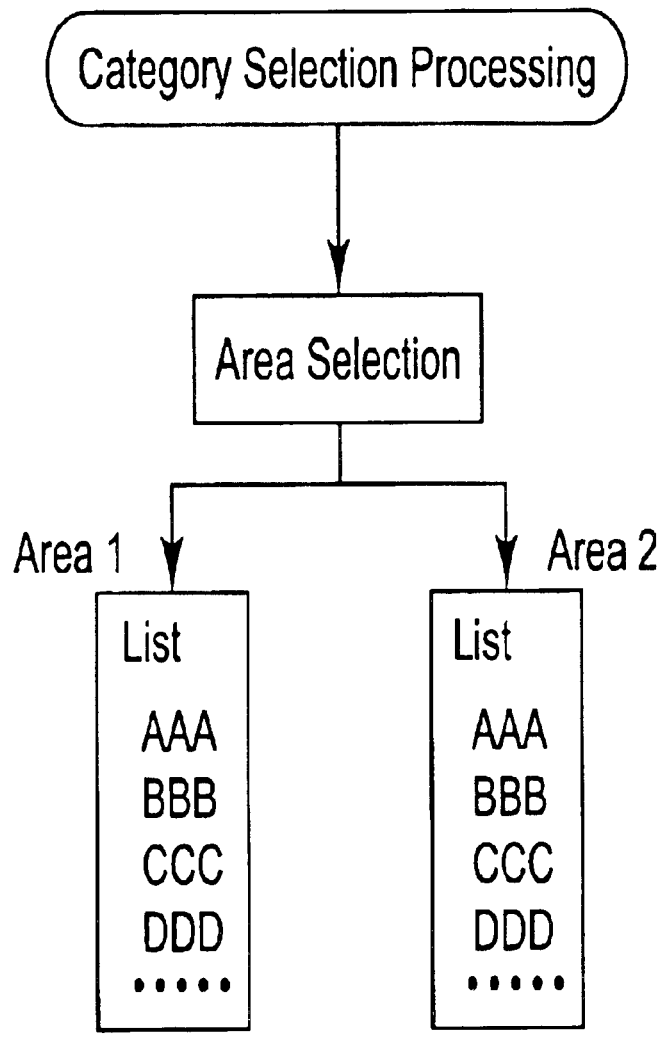
FIG. 15 is a flowchart describing a search process so as to display a list of categories by designating areas.

FIG. 13 is a flowchart describing display screens of selected categories, wherein a list of categories is obtained by selecting an area. For example, the area 1 shows BBB, DDD, EEE, FFF and the area 2 shows AAA, BBB, GGG, HHH. Thus, only existing categories are displayed in respective lists. In area designated searches according to the previous method, even categories with no register points are displayed in a list in some areas since fixed categories common to each area are displayed in a list (see FIG. 15). However, this problem is avoided in the invention. Further, all the categories may be displayed by making a distinction between the presence and absence of the register points, in addition to displaying only categories with register points in a list.

What is claimed is:

1. A navigation system, comprising:

an input means for inputting a reference position for searching register points;

an information storage means for storing register points, wherein said register points are divided into an area or block, and said register points in each area or block are divided into at least one category, and flags representing the presence or absence of said register points are given to each category of each area or block;

a search means for searching each category of said register points existing within a predetermined limit on the basis of said reference position input by said input means by referring to said flags representing the presence or absence of said register points in said information storage means; and a display means for displaying each category with flags representing the presence of the register points searched by said searching means.

2. A navigation system, comprising:

an input means for inputting information for searching register points;

an information storage means for storing register points, wherein said register points are divided into an area or block and said register points in each area or block are divided into at least one category and flags representing the presence or absence of said register points are given to each category of each area or block;

a search means for searching each category of said register points belonging to each area or block input by said input means by referring to said flags representing the presence or absence of said register points in said information storage means; and a display means for displaying each category with flags representing the presence of the register points searched by said searching means.

3. A navigation system, comprising:

an input means for inputting information for searching register points;

an information storage means for storing register points, wherein said register points are divided into at least one category and said register points in each category are assigned to an area or block and flags representing the presence or absence of said register points are given to each area or block of each category;

a search means for searching an area of said register points belonging to the category input by said input means by referring to said flags representing the presence or absence of said register points in said information storage means; and a display means for displaying an area with flags representing the presence of the register points searched by said searching means.

* * * * *